(12) United States Patent
Ru (10) Patent No.: US 12,433,564 B2
(45) Date of Patent: Oct. 7, 2025

(54) SYSTEMS AND METHODS FOR DETERMINING PERFORMANCE OF A BREAST COMPRESSION PADDLE

(71) Applicant: HOLOGIC, INC., Marlborough, MA (US)

(72) Inventor: Guoyun Ru, Marlborough, MA (US)

(73) Assignee: Hologic, Inc., Marlborough, MA (US)

( * ) Notice: Subject to any disclaimer, the term of this patent is extended or adjusted under 35 U.S.C. 154(b) by 225 days.

(21) Appl. No.: 18/245,146

(22) PCT Filed: Aug. 26, 2021

(86) PCT No.: PCT/US2021/047794
§ 371 (c)(1),
(2) Date: Mar. 13, 2023

(87) PCT Pub. No.: WO2022/060553
PCT Pub. Date: Mar. 24, 2022

(65) Prior Publication Data
US 2024/0016467 A1 Jan. 18, 2024

Related U.S. Application Data

(60) Provisional application No. 63/078,360, filed on Sep. 15, 2020.

(51) Int. Cl.
*A61B 6/58* (2024.01)
*A61B 6/04* (2006.01)
*A61B 6/50* (2024.01)

(52) U.S. Cl.
CPC ............ *A61B 6/586* (2013.01); *A61B 6/0414* (2013.01); *A61B 6/0435* (2013.01); *A61B 6/502* (2013.01)

(58) Field of Classification Search
CPC ....... A61B 6/502; A61B 6/586; A61B 6/0414; A61B 6/0435; A61B 6/025; A61B 6/032;
(Continued)

(56) References Cited

U.S. PATENT DOCUMENTS

| | | | |
|---|---|---|---|
| 5,335,257 | A | 8/1994 | Stunberg |
| 6,049,583 | A | 4/2000 | Galkin |

(Continued)

FOREIGN PATENT DOCUMENTS

| | | |
|---|---|---|
| JP | 2011-024748 A | 2/2011 |
| JP | 2015-192827 A | 11/2015 |
| WO | 2014/097026 A1 | 6/2014 |

OTHER PUBLICATIONS

PCT International Preliminary Report on Patentability in International Application PCT/US2021/047794, mailed Mar. 30, 2023, 7 pages.

(Continued)

*Primary Examiner* — Irakli Kiknadze
(74) *Attorney, Agent, or Firm* — Merchant & Gould P.C.

(57) ABSTRACT

A method of determining performance characteristics of a breast compression paddle utilized in a breast imaging system includes receiving a force application signal, wherein the force application signal is associated with an application of a compressive force by the breast imaging system with the breast compression paddle to a breast of a patient. The method applies the force application signal to an algorithm to obtain a reduction value. The reduction value is subtracted from a known paddle performance value for the breast compression paddle to obtain an updated paddle performance value for the breast compression paddle.

20 Claims, 10 Drawing Sheets

(58) Field of Classification Search
CPC ....... A61B 6/04; A61B 6/4233; A61B 6/4411;
A61B 6/4423; A61B 6/4441; A61B
6/4447; A61B 6/4452; A61B 6/5252;
A61B 6/5258; A61B 6/582; A61B 6/482;
A61B 6/583; A61B 6/542; A61B 6/544;
A61B 6/4283; A61B 6/545; A61B 6/465;
A61B 6/5205; A61B 2562/02; A61B
6/468; A61B 6/547; A61B 6/022;
A61B 6/463; A61B 6/469; A61B 6/461; A61B
6/5235; A61B 6/466; A61B 5/4312; A61B
5/055; A61B 10/0041; A61B 10/0233;
A61B 6/107; A61B 6/4208; A61B 6/44;
A61B 6/54; A61B 6/507; A61B 5/02255;
A61B 5/0091; A61B 5/0053; A61B
5/708; A61B 5/021; A61B 5/02108; A61B
6/02; G06N 5/01; G06F 17/11; G05B
13/024; G06T 19/006; G06T 7/0012;
G06T 2207/30068; G06T 2207/10112
USPC ............................................ 378/37, 63, 207
See application file for complete search history.

(56) References Cited

U.S. PATENT DOCUMENTS

| 10,368,817 | B2* | 8/2019 | Kreeger | G06T 19/00 |
| 10,695,010 | B2* | 6/2020 | Blaski | A61B 6/0435 |
| 10,888,292 | B2* | 1/2021 | Stango | A61B 6/4411 |
| 10,925,566 | B2* | 2/2021 | Oh | A61B 6/463 |
| 10,932,740 | B2* | 3/2021 | Homann | A61B 5/0053 |
| 11,158,045 | B2* | 10/2021 | Douglas | A61B 6/022 |
| 11,364,000 | B2* | 6/2022 | Defreitas | A61B 6/0435 |
| 11,375,968 | B2* | 7/2022 | Vancamberg | A61B 6/545 |
| 2007/0019785 | A1 | 1/2007 | Galkin | |
| 2013/0138016 | A1 | 5/2013 | Shekhara et al. | |

OTHER PUBLICATIONS

1 International Search Report and Written Opinion for PCT/US2021/047794 (Dec. 23, 2021).

* cited by examiner

SYSTEMS AND METHODS FOR DETERMINING PERFORMANCE OF A BREAST COMPRESSION PADDLE

CROSS-REFERENCE TO RELATED APPLICATIONS

This application is a National Stage Application of PCT/US2021/047794 filed on Aug. 26, 2021, which claims the benefit of priority to U.S. Provisional Patent Application No. 63/078,360, filed Sep. 15, 2020, the entire disclosures of which are incorporated by reference in their entireties. To the extent appropriate, a claim of priority is made to each of the above disclosed applications.

BACKGROUND

Compression during mammography and tomosynthesis imaging serves a number of purposes. For example, it: (1) makes the breast thinner in the direction of x-ray flux and thereby reduces patient radiation exposure from the level required to image the thicker parts of a breast that are not compressed; (2) makes the breast more uniform in thickness in the direction of x-ray flux and thereby facilitates more uniform exposure at the image plane over the entire breast image; (3) immobilizes the breast during the x-ray exposure and thereby reduces image blurring; and (4) brings breast tissues out from the chest wall into the imaging exposure field and thus allows for more tissue imaging. As the breast is being compressed, typically a technologist manipulates the breast to position it appropriately and counter the tendency that compression has of pushing breast tissue toward the chest wall and out of the image field. Rigid paddles, or those utilizing a thick compressive foam element, may be utilized in breast imaging procedures.

SUMMARY

In one aspect, the technology relates to a method of determining performance characteristics of a breast compression paddle utilized in a breast imaging system, the method including: receiving a force application signal, wherein the force application signal is associated with an application of a compressive force by the breast imaging system with the breast compression paddle to a breast of a patient; applying the force application signal to an algorithm to obtain a reduction value; and subtracting the reduction value from a known paddle performance value for the breast compression paddle to obtain an updated paddle performance value for the breast compression paddle. In an example, the method further includes sending a result signal corresponding to the updated paddle performance value. In another example, the result signal is sent to a storage device disposed on the paddle. In yet another example, the result signal is sent to a storage device remote from both the breast imaging system and the breast compression paddle. In still another example, the algorithm includes a datum performance value corresponding to a known force.

In another example of the above aspect, the algorithm further includes dividing the datum performance value by an applied performance value associated with the force application signal to obtain the reduction value. In an example, subsequent to a first application of the force application signal to the algorithm, and a first subtraction of the reduction value from the known paddle performance value, the updated paddle performance value includes a known paddle performance value for a second application of the force application signal to the algorithm.

In another aspect, the technology relates to a system for determining performance characteristics of a breast compression paddle utilized in a breast imaging system, the system including: a breast support platform for supporting a breast; a tube head rotatable relative to the breast support platform; an x-ray source disposed in the tube head; an x-ray detector disposed in the breast support platform; a compression paddle disposed between the x-ray source and the x-ray detector and configured to compress the breast against the breast support platform; a controller for controlling the x-ray source; at least one processor communicatively coupled to the controller; and memory communicatively coupled to the at least one processor, the memory includes computer executable instructions that, when executed by the processor, performs a method that includes: receiving a force application signal, wherein the force application signal is associated with an application of a compressive force to the breast between the breast support platform and the compression paddle; and calculating a performance effect on the compression paddle based at least in part on the force application signal. In an example, the compression paddle includes a data storage device. In another example, the data storage device includes an RFID chip. In yet another example, the data storage device is communicatively coupled to the at least one processor. In still another example, the system further includes sending a performance effect signal to the data storage device of the compression paddle, wherein the performance effect signal includes a calculation of a number of paddle compressions remaining for the compression paddle.

In another example of the above aspect, the system further includes sending a service recommendation signal. In an example, the at least one processor and the memory are disposed remote from the controller. In another example, the at least one processor and the memory are integral with the controller.

In another aspect, the technology relates to a method of determining performance characteristics of a breast compression paddle utilized in a breast imaging system, the method including: reading a known paddle performance value from a data storage unit disposed on the breast compression paddle; applying a force to the breast, while supported on a breast support platform, with the breast compression paddle; recording the force applied to the breast with the breast compression paddle; applying the applied force to an algorithm to obtain a reduction value; calculating an updated paddle performance value for the breast compression paddle, wherein the updated paddle performance value is based at least in part on the known paddle performance value and the reduction value; and writing the updated paddle performance value to the data storage unit disposed on the breast compression paddle. In an example, the known paddle performance value is based at least in part on a compression paddle material. In another example, applying the applied force to an algorithm includes dividing a datum performance value at a known force by an applied performance value associated with the applied force. In yet another example, calculating the updated paddle performance value includes subtracting the reduction value from the known paddle performance value. In still another example, writing the updated paddle performance value to the data storage unit includes sending a signal to the data storage unit.

DETAILED DESCRIPTION

As described further below, different types of paddles are used for by breast imaging systems. Some paddles have different shapes to accommodate different breast sizes, are made of different materials, and/or are used for different types of procedures. In addition, different technologists apply differing amounts of pressure based on skill and experience or the size or density of the patient's breast. Life cycle testing typically contemplates counting the number of uses of a particular paddle, in an effort to determine its potential time to failure. Such a simplistic approach is not useful for breast compression paddles since different compressive forces may be applied during different procedures. A more robust approach is needed that takes the variable compressive forces used in an imaging system.

Figure 1A:
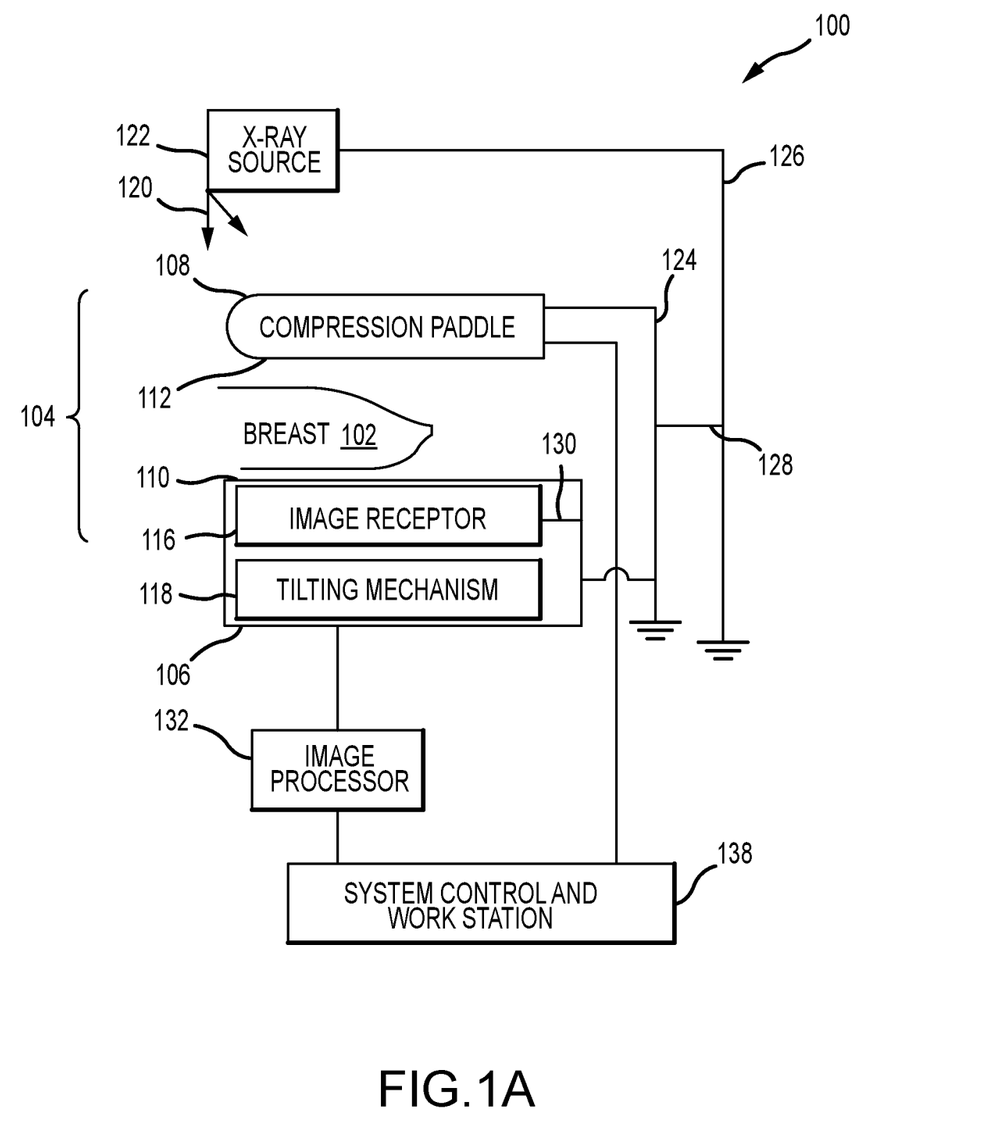
FIG. 1A is a schematic view of an exemplary imaging system.
Figure 1B:
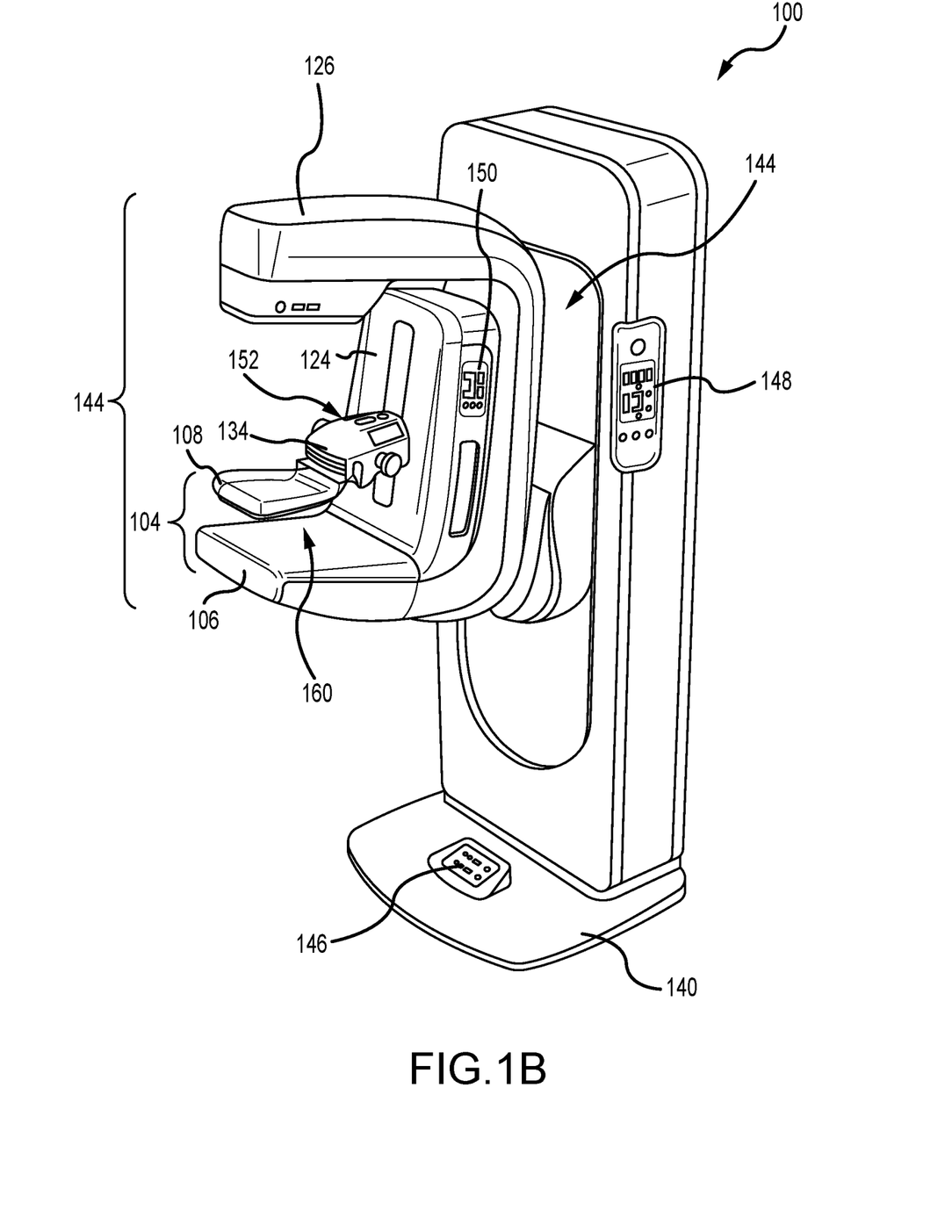
FIG. 1B is a perspective view of the imaging system of FIG. 1A.

FIG. 1A is a schematic view of an exemplary imaging system 100 and FIG. 1B is a perspective view of the imaging system 100 with which compression paddles are used. Referring concurrently to FIGS. 1A and 1B, not every element described below is depicted in both figures. The imaging system 100 immobilizes a patient's breast 102 for x-ray imaging (either or both of mammography, tomosynthesis, or other imaging modalities) via a breast compression immobilizer unit 104 that includes a static breast support platform 106 and a moveable paddle 108. Different paddles, each having different purposes, are known in the art. Certain examples paddles are also described herein for context. The breast support platform 106 and the paddle 108 each have a compression surface 110 and 112, respectively, that move towards each other to compress, immobilize, stabilize, or otherwise hold and secure the breast 102 during imaging procedures. In known systems, the compression surface 110, 112 is exposed so as to directly contact the breast 102. Either or both of these compression surfaces 110, 112 may be rigid plastic, a flexible plastic, a resilient foam, a mesh or screen, and so on. The platform 106 also houses an image receptor 116 and, optionally, a tilting mechanism 118, and optionally an anti-scatter grid (not depicted, but disposed above the image receptor 116). The immobilizer unit 104 is in a path of an imaging beam 120 emanating from x-ray source 122, such that the beam 120 impinges on the image receptor 116.

The immobilizer unit 104 is supported on a first support arm 124 via a compression arm 134, which is configured to be raised and lowered along the support arm 124. The x-ray source 122 is supported on a second support arm, also referred to as a tube head 126. For mammography, support arms 124 and 126 can rotate as a unit about an axis 128 between different imaging orientations such as CC and MLO, so that the system 100 can take a mammogram projection image at each orientation. In operation, the image receptor 116 remains in place relative to the platform 106 while an image is taken. The immobilizer unit 104 releases the breast 102 for movement of arms 124, 126 to a different imaging orientation. For tomosynthesis, the support arm 124 stays in place, with the breast 102 immobilized and remaining in place, while at least the second support arm 126 rotates the x-ray source 122 relative to the immobilizer unit 104 and the compressed breast 102 about the axis 128. The system 100 takes plural tomosynthesis projection images of the breast 102 at respective angles of the beam 120 relative to the breast 102.

Concurrently and optionally, the image receptor 116 may be tilted relative to the breast support platform 106 and in sync with the rotation of the second support arm 126. The tilting can be through the same angle as the rotation of the x-ray source 122, but may also be through a different angle selected such that the beam 120 remains substantially in the same position on the image receptor 116 for each of the plural images. The tilting can be about an axis 130, which can but need not be in the image plane of the image receptor 116. The tilting mechanism 118 that is coupled to the image receptor 116 can drive the image receptor 116 in a tilting motion. For tomosynthesis imaging and/or CT imaging, the breast support platform 106 can be horizontal or can be at an angle to the horizontal, e.g., at an orientation similar to that for conventional MLO imaging in mammography. The system 100 can be solely a mammography system, a CT system, or solely a tomosynthesis system, other modalities such as ultrasound, or a "combo" system that can perform multiple forms of imaging. An example of a system has been offered by the assignee hereof under the trade name Selenia Dimensions.

When the system is operated, the image receptor 116 produces imaging information in response to illumination by the imaging beam 120, and supplies it to an image processor 132 for processing and generating breast x-ray images. A system control and work station unit 138 including software controls the operation of the system and interacts with the operator to receive commands and deliver information including processed-ray images.

The imaging system 100 includes a floor mount or base 140 for supporting the imaging system 100 on a floor. A gantry 142 extends upwards from the floor mount 140 and rotatably supports both the tube head 208 and a support arm 210. The tube head 126 and support arm 124 are configured to rotate discretely from each other and may also be raised and lowered along a face 144 of the gantry 142 so as to accommodate patients of different heights. The x-ray source 122 is disposed within the tube head 208. Together, the tube head 126 and support arm 124 may be referred to as a C-arm 144.

A number of interfaces and display screens are disposed on the imaging system 100. These include a foot display screen 146, a gantry interface 148, a support arm interface 150, and a compression arm interface 152. In general the various interfaces 148, 150, and 152 may include one or more tactile buttons, knobs, switches, as well as one or more display screens, including capacitive touch screens with graphic user interfaces (GUIs) so as to enable user interaction with and control of the imaging system 100. In general, the foot display screen 146 is primarily a display screen, though a capacitive touch screen might be utilized if required or desired.

Figure 2A:
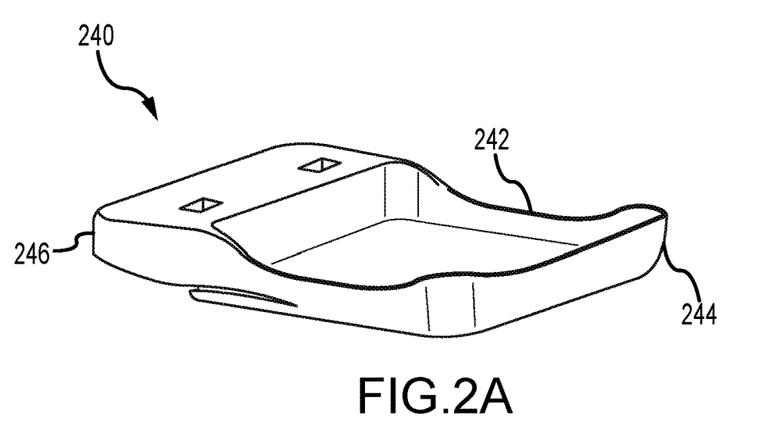
FIGS. 2A-2C depict an example of a flat breast compression paddle.
Figure 2B:
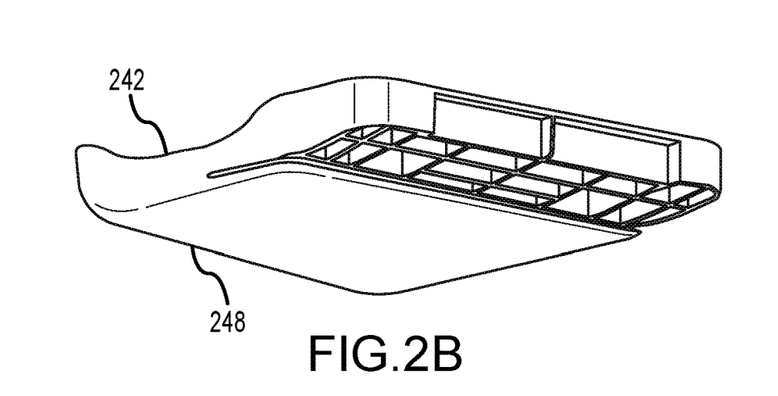
Figure 2C:
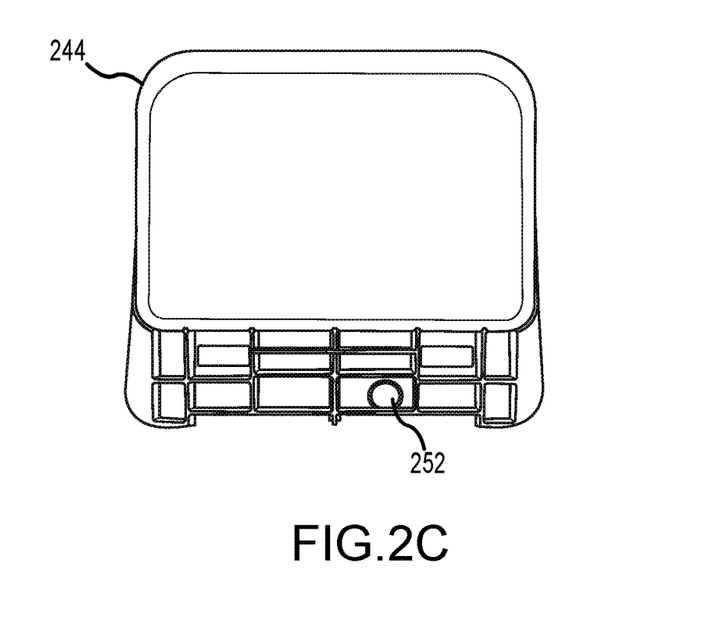

Referring now to FIGS. 2A-2C, shown is an example of a compression paddle 240 that includes generally rounded corners about the front wall to the bottom of the compression paddle and generally rounded corners about the front wall to the side wall. Compression paddle 240 includes features to facilitate greater flexibility and greater conformity to breast tissue. Side walls 242 have a height lower about a portion between the front wall 244 and rear wall 246 than that of the height of the front wall 244 and/or rear 246, e.g., lower by about 20% to about 80%, preferably about 25% to about 50%. Having a side wall with a lower portion facilitates for articulation of the compression paddle 240 at the front wall 244. The compression paddle 240 may also, optionally, include slots formed near the rear corners to facilitate more flexure of the bottom of the compression paddle, as well as the compression paddle 240 overall. Additional optional modifications to increase the flexibility of the compression paddle 240 include varying the thickness of the paddle (e.g., with a portion of the bottom of the compression paddle being thicker than other portions, such as the middle portion having a thickness greater than the portions closer to the side walls) and manufacturing the compression paddle 240 from more flexible materials from known compression paddles (e.g., preferably made with materials that are about 40% more flexible). The compression paddle 240 can be used to compress a patient's breast with or without an inflatable jacket and/or a gel pad as known in the art. The paddle 240 also includes a data storage element 252, such as an RFID chip.

Figure 3A:
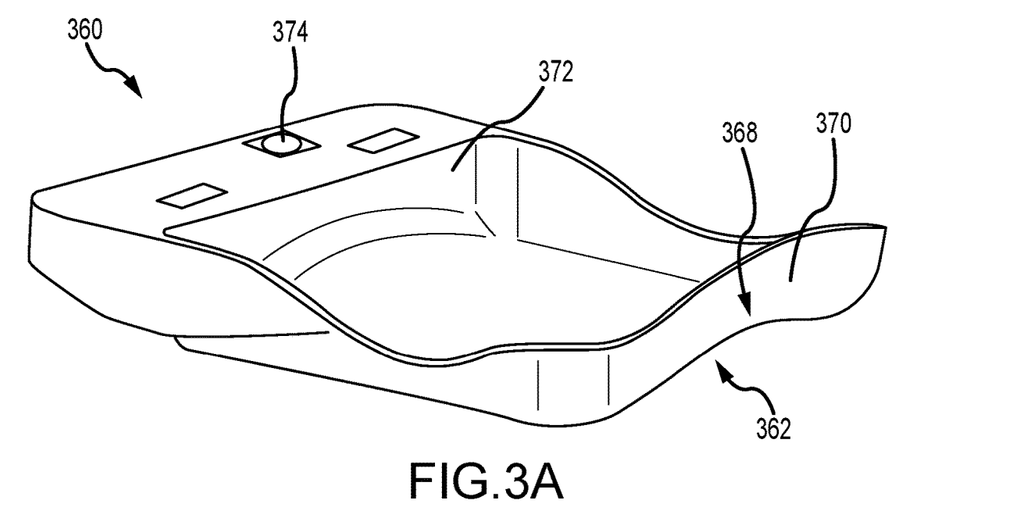
FIGS. 3A-3C depict an example of a contoured breast compression paddle.
Figure 3B:
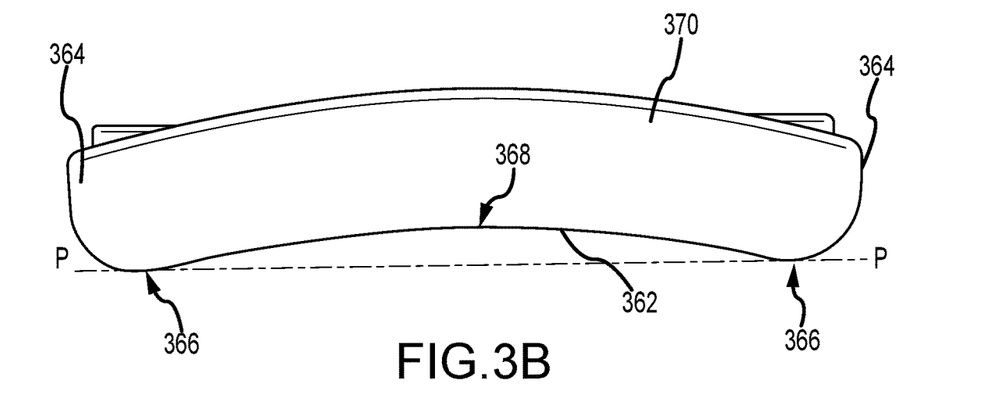
Figure 3C:
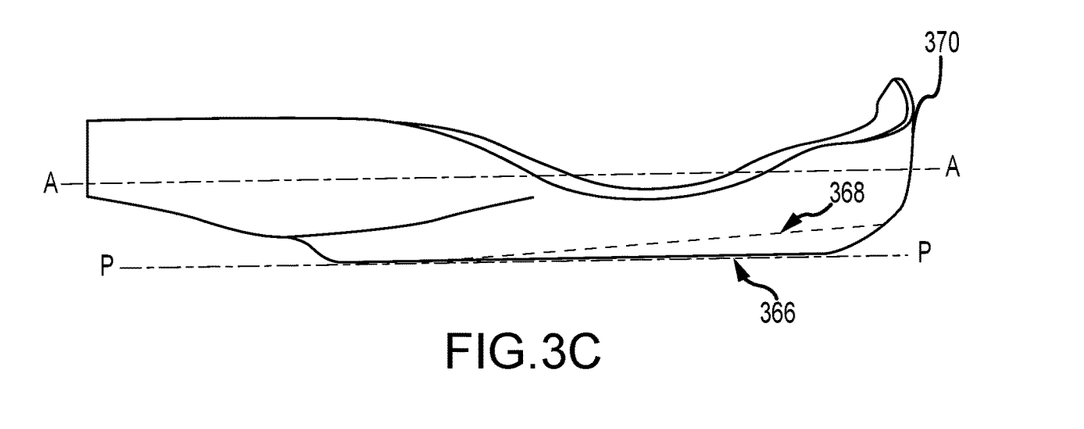

FIGS. 3A-3C depict an example of a contoured compression paddle 360. The bottom wall of compression paddle 360 includes a generally concave surface 362, which generally may correspond in shape to a breast and/or a compressed breast. The generally concave surface 362 can extend generally between the side walls 364 of the compression paddle 362. Alternatively, a portion of the bottom surface includes a generally concave surface 362, which helps to match the contour of breast tissue. The generally concave surface 362 helps to distribute more equally forces applied to the breast to more closely correspond to the shape of the breast. Such a configuration may help provide more comfort to a patient as the breast is being compressed. The generally concave surface 362 includes two outer edge portions 366 that define a reference plane P, as well as a central portion 368. The central portion 368 is non-coplanar with the outer edge portions 366, such that the central portion 368 is raised relative to or disposed above the reference plane P. The central portion 368 may be level (e.g., parallel to the reference plane P or an axis A of the paddle 360) or may be pitched downward from a front wall 370 to a rear wall 372 of the paddle 360. This may help further conform the paddle 360 to the shape of the breast. The paddle 360 also includes a data storage element 374, such as an RFID chip.

Figure 4:
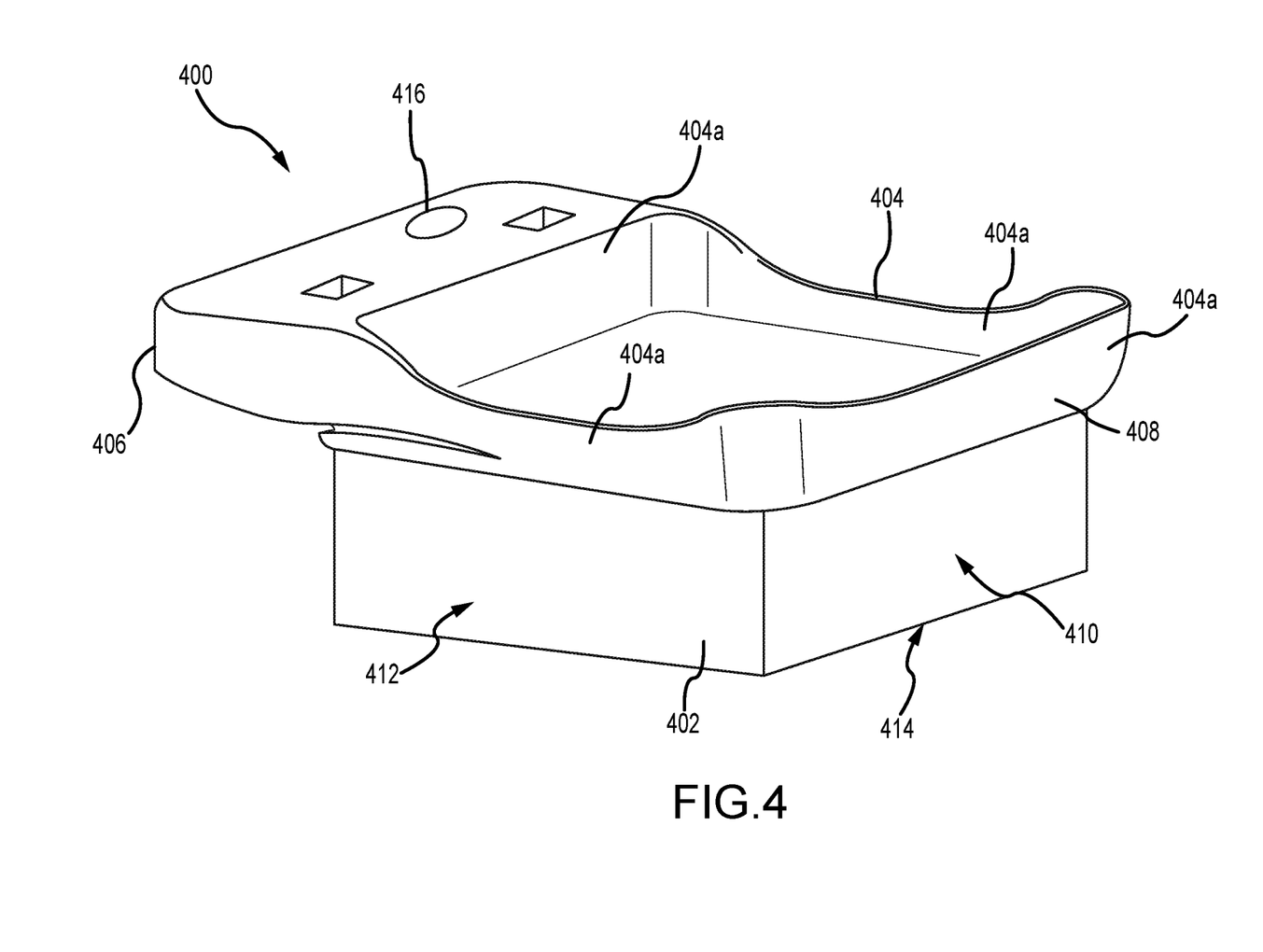
FIG. 4 depicts an example of a breast stabilization paddle that includes a foam compressive element.

FIG. 4 depicts a breast compression paddle 400 having a foam compressive element 402 secured to a rigid substrate 404. Compression paddles that utilize foam compressive elements stabilize the breast, but without the significant compressive action typical of a rigid compression paddle, such as those depicted above. Some compressive action does occur, however. This compression is limited, however, and is typically sufficient to stabilize the breast for imaging procedures, but with reduced discomfort to the patient (as compared to a standard rigid breast compression paddle). As such, breast compression paddles including foam compressive elements may be described as performing the function of stabilizing or immobilizing the breast, with a minimal amount of compression. In the context of this application, for clarity, the term "compression" is used to describe the function of various types of paddles used for breast imaging, regardless of the construction thereof. The paddle 400 includes a bracket portion 406, generally integral with the substrate 404 for connecting the paddle to compression arm of an imaging system. The paddle 400 also includes a leading face 408, opposite the bracket portion 406, which is disposed proximate a chest wall of a patient during compression and imaging procedures. In examples, the substrate may be rigid. As used herein, the term "rigid" does not imply that the substrate 404 is free from bending during compression of a breast, rather that the substrate 404 displays greater resistance to bending or deformation than the foam compressive element 402 secured to a bottom of the substrate 404. Raised walls 404a provide additional rigidity.

The foam compressive element 402 may be secured to a bottom surface of the substrate 404 with a chemical adhesive. In other example, an upper surface of the compressive element may be a rigid plastic or other material to which the foam compressive element 402 is secured. A plurality of bolts, hooks, or other mechanical fasteners (not shown) may be used to connect this rigid plastic to the rigid substrate 404 of the paddle 400. The foam compressive element 402 includes a number of edge surfaces, only a portion of which are depicted in FIG. 4. A leading edge surface 410 is disposed proximate the leading face 408 of the substrate 404 so as to be disposed proximate the chest wall of a patient during compression and imaging procedures. A lateral edge surfaces 412 is also depicted. A compressive surface 414 contacts and stabilizes the breast during imaging procedures. The paddle 400 also includes a data storage element 416, such as an RFID chip.

In addition to the above compression paddles and stabilizing paddles, other paddles are known in the art. Other types of paddles used in breast imaging systems may include paddles that include windows or other openings, for example, to accommodate breast biopsy equipment. Still other paddles are hollow, which enables different compressive performance and image visualization. Other paddles include flexible components, such as plastic coverings, e.g., which both changes the breast compression and allows for a disposable covering to avoid cross-contamination. In other examples, breast compression devices may be in the form of a mesh or flexible screen spanning a plurality of rigid components, examples of which may be used for both breast imaging with x-ray or ultrasound. Regardless of configuration, materials utilized in breast imaging paddles may degrade over time. This degradation may occur due to repeated use or applications of force that result in bending of rigid materials, permanent compression of foam or other flexible materials, stretching, twisting, etc. Over time, a breast compression paddle or other device may be stressed to a point that it no longer performs as originally designed. For example, over time, foam compressive elements may not return to their original uncompressed configuration, effectively resulting in a denser foam, which will result in different images, or may cause more uncomfortable compressions. Rigid paddles may lose rigidity or microcracks may form, which can lead to undesirable performance. Cracks or other stress fractures may appear in the foam or the paddle that may be visible as artifacts in the image. Other degradation may occur with different types of paddles or devices. Life cycle testing typically contemplates counting the number of uses of a particular component, in an effort to determine its potential time to failure. Such a simplistic approach is not useful for breast compression paddles or other devices used to stabilize the breast, however, since different compressive forces may be applied during different procedures.

Tracking of paddle performance is further complicated in that an imaging suite may have therein multiple different paddles to be used for, e.g., large breasts, small breast, breast including implants, foam compressive paddles, paddles for biopsies, etc. Certain breast imaging facilities may have many of one type of breast compression paddle that is used regularly, but only a limited number of highly specialized paddles that may be shared among multiple imaging suites within the facility, on an as needed basis. Further complications are introduced because hundreds or thousands of patients may be imaged with a particular paddle during its lifetime, and the breast tissue density of such patients may also significantly vary. In that case, a patient with particularly dense breast tissue may require a higher compressive force for proper imaging, as compared to a patient with less dense breast tissue. Even further complications are present because different technicians may compress to different compressive forces, depending on their experience level, practice requirements, or other factors. Based on the above description, the complexities of tracking performance of breast compression paddles becomes apparent.

As such, the technologies described herein track the usage of a paddle as a function of compressive force applied. Individual types of paddles may be tested, for example, in a performance lab, and the life cycle of each type of paddle may be recorded for applications of a known compressive force. In other applications, performance at certain compressive forces may be modeled based on factors such as paddle dimension(s), material type, material density or thickness, applied pressure or force, etc. As used herein, the term "life cycle" does not necessarily mean the life cycle to a point of physical failure; rather "life cycle" refers to a period of usage after which the paddle no longer performs as desired. While a crack or other dramatic failure may comprise one measure of a life cycle, other measures include permanent compression of a compressive foam, stretching of an elastic element, folding of a flexible mesh, plastic deformation, elastic deformation beyond an acceptable threshold, etc. Thus, by performing a more detailed analysis of paddle usage and predicting unacceptable degradations in performance, a paddle may be inspected, serviced, or replaced prior to significant performance degradation, or at a time based on manufacturer or clinic requirements. The technologies described herein may be used to determine a life cycle of a paddle with such a complicated usage by calculating an effect on performance (life cycle) of the paddle after each use. After calculating the performance effect, a signal associated with the effect may be stored or sent as described elsewhere herein.

The performance tracking technologies described herein may be implemented with advanced artificial intelligence (AI) or machine learning (ML) technologies. For example, performance data about multiple paddles of the same type may be stored at a central repository along with their serial numbers. Paddles having related serial numbers, for example, indicating they were manufactured from the same batch of material, may be associated together. An unexpected (e.g., early) performance degradation in multiple paddles, which may be indicative of an inferior batch of material, may allow the AI or ML technology to update the performance curve for paddles related due to batch material. Thus, the performance curve of the remaining operational paddles may be adjusted to reflect unexpected performance conditions of a certain type of paddle.

Figure 5:
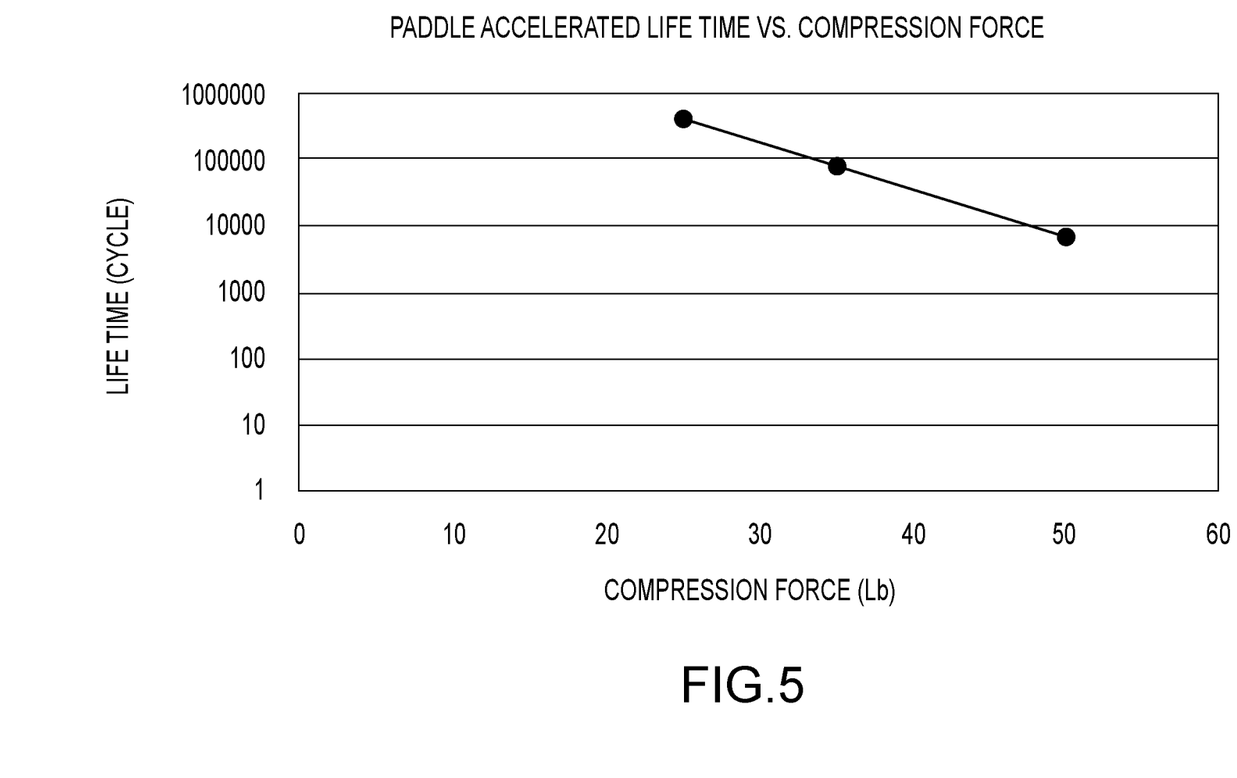
FIG. 5 depicts an example of a performance curve for a compression paddle.

FIG. 5 depicts an example of a performance curve of a compression paddle. The curve plots performance of a hypothetical paddle at three consistently-applied compressive forces. For example, FIG. 5 indicates that if the hypothetical paddle was subject to a compressive force of about 25 lbs. consistently (e.g., at each compression), the paddle would display a lifetime performance of about 500,000 cycles. For that same type of paddle, a compressive force application of about 35 lbs. results in a lifetime performance of about 90,000 cycles. For the same type of paddle, a consistent compressive force application of about 50 lbs. results in a lifetime performance of about 8,000 cycles. Thus, the performance curve makes clear that increased compressive forces applied with the paddle accelerate the reduction in lifetime performance thereof. Such a performance curve may be plotted for any type of paddle based on testing in a controlled environment, estimations based on material or structural criteria, estimates based on similar known paddles, computer modeling, etc.

Returning to the hypothetical paddle performance depicted in FIG. 5, when consistently subjected to 25 lbs. compressive force, the paddle will have a life time of about 500,000 cycles. Thus, a single 25 lb. compression of a new paddle will reduce that life time to 499,999 cycles based on the following equation:

$$LTR = LTP - \left(\frac{PVdatum}{PVapplied}\right) \quad \text{(Equation 1)}$$

Where:
LTR equals the remaining life time of the actual paddle after a single compression,
LTP equals the present life time of the actual paddle prior to the single compression,
PVdatum is the datum performance value and equals the life time of a known example paddle at a datum or known compression force, and
PVapplied is the applied performance value and equals the life time of the known example paddle at the force applied during the actual single compression.

Further:
PVdatum/PVapplied is the reduction value, which is the amount by which the life of the paddle is reduced based on the applied compressive force.

Thus, for the 25 lb. compressive force applied to a new paddle having a performance curve as depicted in FIG. 5, Equation 1 appears as follows:

$$499,999 = 500,000 - \left(\frac{500,000}{500,000}\right)$$

Compare the above equation (at 25 lb.) to the following equation, which represents another new paddle consistent with that depicted in FIG. 5, but where a force of 50 lbs. is applied. In that case, for the 50 lb. compressive force applied, Equation 1 appears as follows:

$$\sim 499{,}938 = 500{,}000 - \left(\frac{500{,}000}{8{,}000}\right)$$

As can be seen, for the hypothetical paddle, a single compression at a force twice that of the datum force results in a reduction in life time of over sixty (60) times that of the datum force. Thus, the need to track forces applied to individual paddles is critical to make an accurate determination of life cycle. This tracking information may be calculated after each compression and stored, either at an individual paddle (e.g., at the data storage unit disposed thereon), at a local repository (e.g., at an imaging system or a dedicated acquisition work station), or at a networked repository (e.g., a hospital network where information about multiple paddles and multiple workstations is stored). When the remaining life time of a particular paddle reaches a predetermined threshold, a notification or recommendation may be sent, indicating that the paddle should be serviced, inspected, or completely or partially replaced.

Figure 6A:
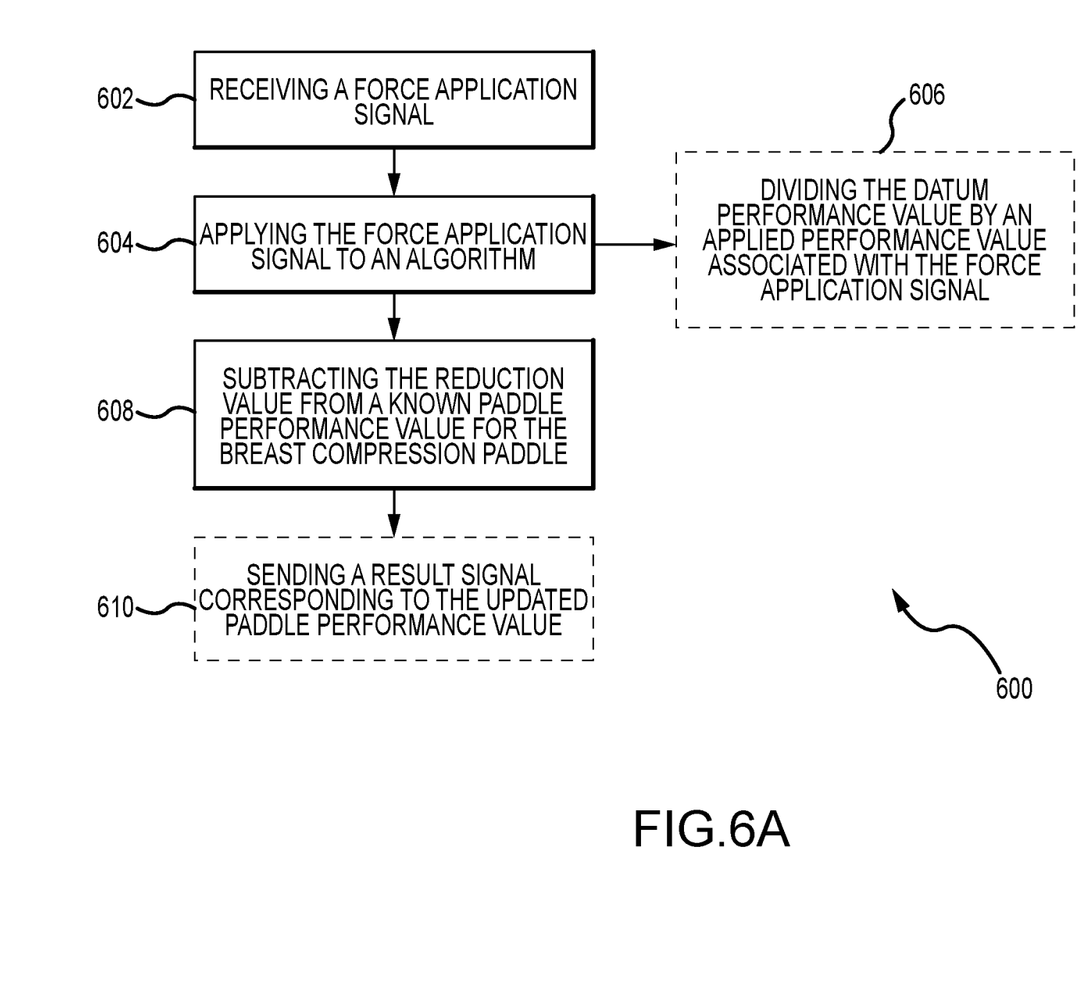
FIG. 6A depicts a method of determining performance characteristics of a breast compression paddle.

FIG. 6A depicts a method 600 of determining performance characteristics of a breast compression paddle, examples of which are depicted herein. Such a paddle may be used, for example, in a breast imaging system, also depicted herein. The method 600 begins with operation 602, receiving a force application signal. The force application signal is associated with an application of a compressive force by the breast imaging system with the breast compression paddle to a breast of a patient. This force may be measured by appropriate sensors on the imaging system, as known in the art and sent to a remote or local processor for the required calculations. In some examples, the force application signal may be the applied force. The method 600 continues with operation 604, applying the force application signal to an algorithm. This algorithm, in examples, may be Equation 1 depicted above in the context of FIG. 5. Upon applying the force application signal, a reduction value is obtained. In examples, the algorithm may include a datum performance value, which corresponds to paddle performance at a known or datum compressive force. This datum force may be a compressive force consistently applied to a paddle of a similar type, which may be performed to test the life time of such a paddle. In that regard, the datum performance value, may be the life time of the paddle when the datum force is consistently applied. In a specific example, the datum performance value may be divided by the applied performance value, which is associated with the force application signal, as depicted in operation 606.

Once the reduction value is obtained, operation 608, subtracting the reduction value from a known paddle performance value for the breast compression paddle is performed. Upon performing this subtraction, an updated paddle performance value for the subject breast compression paddle is obtained. The known paddle performance value may be the known remaining life of the subject paddle being used. The remaining life of the paddle may be constantly updated after each application of force. In that case, after a first application of the force application signal to the algorithm (e.g., operation 604 and/or 606), and a first subtraction of the reduction value from the known paddle performance value (e.g., operation 608), the updated paddle performance value would then be the known paddle performance value for a subsequent application of force with the paddle and performance of the method 600.

The method 600 may conclude with operation 610, sending a result signal corresponding to the updated paddle performance value. In examples, the result signal may be sent to a storage device disposed on the paddle, for example, the RFID chip depicted in the above figures. In another example, the information may be stored at the breast imaging system, along with identifying information from the paddle (e.g., serial number), which may be read from the RFID chip prior to each use. In another example, the result signal may be sent to a storage device remote from both the breast imaging system and the breast compression paddle, for example, a hospital or clinic network. Information associated therewith (e.g., paddle serial number) may be also stored for future access. In another example, the signal may be sent to a display on the breast imaging system, for example, indicating that the particular compression paddle should be repaired or replaced, having reached the end of its life cycle. This signal may also be sent to a central computer system, which may in turn send a signal to a paddle manufacturer to initiate an order for a new paddle, service for an existing paddle, and so on. In another example, the signal may be used for predictive maintenance, which may include scheduling service in advance of a previously determined date. For example, a determination that a paddle has a set number of uses remaining, that number of uses may correspond to a specific period of time (e.g., a week or two weeks) based on historical usage data of that imaging system and expected applied compression force(s). This would enable the scheduling of a service appointment at a specific date in advance of that period of time, to avoid failure.

Figure 6B:
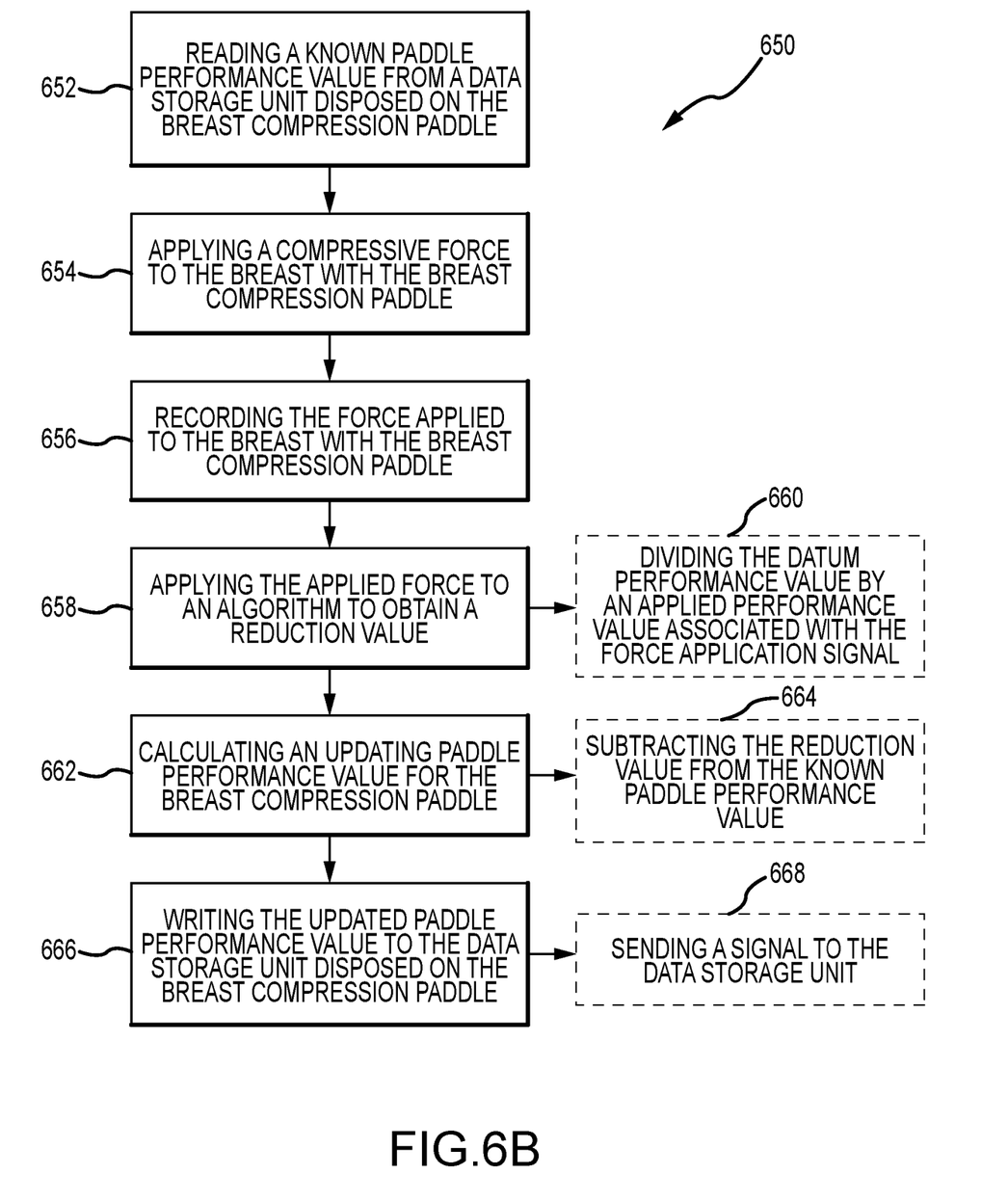
FIG. 6B depicts a method of tracking performance characteristics of a breast compression paddle.

FIG. 6B depicts a method 650 of tracking performance characteristics of a breast compression paddle. The method 650 begins with reading a known paddle performance value from a data storage unit disposed on the breast compression paddle, operation 652. The known paddle performance value may, in certain examples, be the remaining life of a particular compression paddle. As described elsewhere herein, this known paddle performance value may be based at least in part on the material that makes the compression paddle (or parts thereof), paddle dimensions, etc. For example, for paddles such as those depicted in FIG. 2C, which depict a foam compressive element secured to a rigid substrate, the known paddle performance value may be based on the foam material, which is more likely to degrade over time than the rigid substrate. As with known imaging procedures, while the breast is supported on a breast support platform, operation 654, applying a compressive force to the breast with the breast compression paddle, may be performed. This applied compressive force is recorded at operation 656. Thereafter, the compressive force applied by the compression paddle is applied to an algorithm to obtain a reduction value. This algorithm, in examples, may be the equation depicted above in the context of FIG. 5. In examples, the algorithm may include a datum performance value, which corresponds to a known or datum compressive force. This datum compressive force may be a compressive force consistently applied to a paddle of a similar type, which may be performed to test the life time of such a paddle. In that regard, the datum performance value may be the life time of the paddle, when the datum compressive force is consistently applied. In a specific example, the datum performance value may be divided by the applied performance value, which is associated with the force application signal, as depicted in operation 660.

Thereafter, operation 662, calculating an updated paddle performance value for the breast compression paddle, is performed. The updated paddle performance value may be based at least in part on the known paddle performance value and the reduction value. In optional operation 664, this calculation may include subtracting the reduction value from the known paddle performance value. In operation 666, the updated paddle performance value is written to the data storage unit (e.g., the RFID chip) disposed on the breast compression paddle. In optional operation 668, writing the updated paddle performance value to the data storage unit includes sending a signal to the data storage unit.

Figure 7:
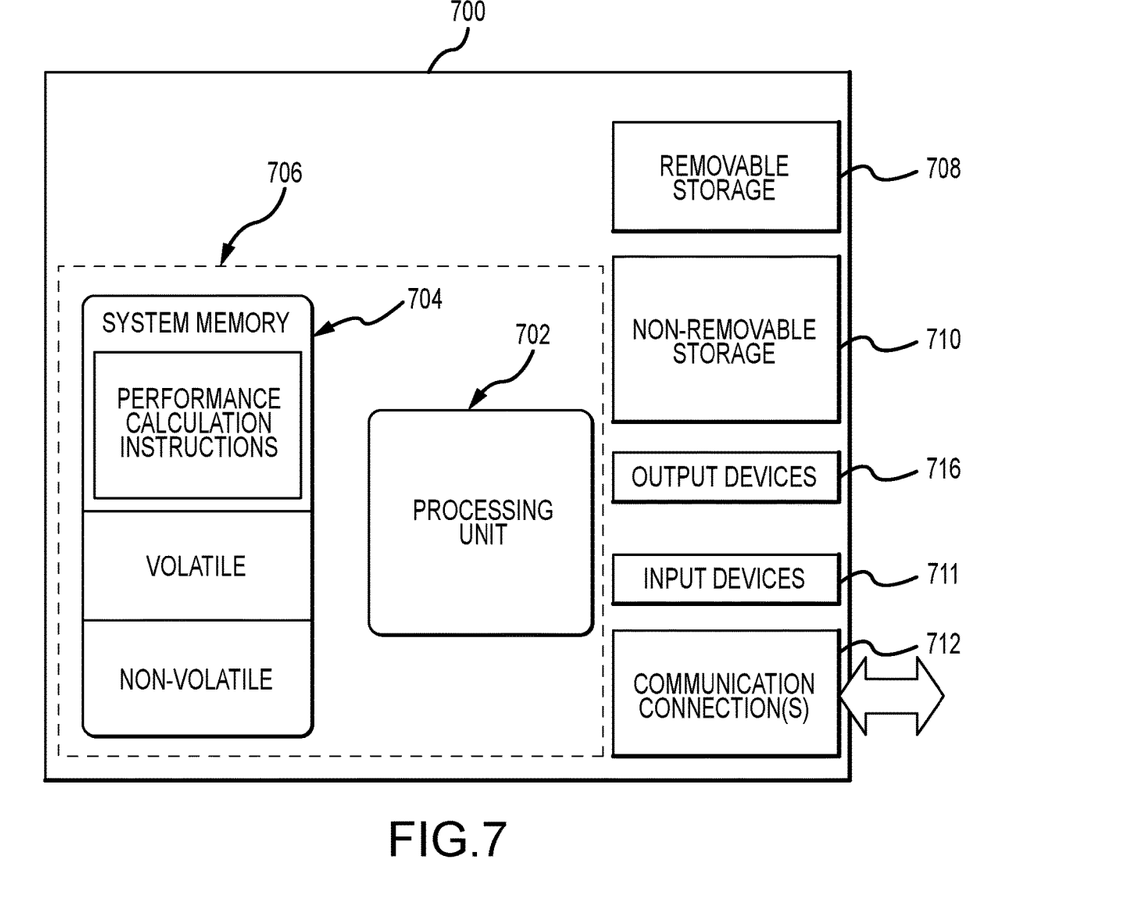
FIG. 7 depicts an example of a suitable operating environment in which one or more of the present examples can be implemented.

FIG. 7 illustrates one example of a suitable operating environment 700 in which one or more of the present examples can be implemented. This operating environment may be incorporated directly into the visualization systems disclosed herein, or may be incorporated into a computer system discrete from, but used to control the breast imaging systems described herein. Such as computer system may be, e.g., the work station depicted in FIG. 1A. This is only one example of a suitable operating environment and is not intended to suggest any limitation as to the scope of use or functionality. Other well-known computing systems, environments, and/or configurations that can be suitable for use include, but are not limited to, imaging systems, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, instructions to read from data storage devices or sensors, or perform other methods disclosed herein) can be volatile (such as RAM), non-volatile (such as ROM, flash memory, etc.), or some combination of the two. This most basic configuration is illustrated in FIG. 7 by dashed line 706. Further, environment 700 can also include storage devices (removable, 708, and/or non-removable, 710) including, but not limited to, magnetic or optical disks or tape. Similarly, environment 700 can also have input device(s) 714 such as touch screens, keyboard, mouse, pen, voice input, etc., and/or output device(s) 716 such as a display, speakers, printer, etc. Also included in the environment can be one or more communication connections 712, such as LAN, WAN, point to point, Bluetooth, RF, etc.

Operating environment 700 typically includes at least some form of computer readable media. Computer readable media can be any available media that can be accessed by processing unit 702 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 700 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some embodiments, the components described herein include such modules or instructions executable by computer system 700 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 700 is part of a network that stores data in remote storage media for use by the computer system 700.

Figure 8:
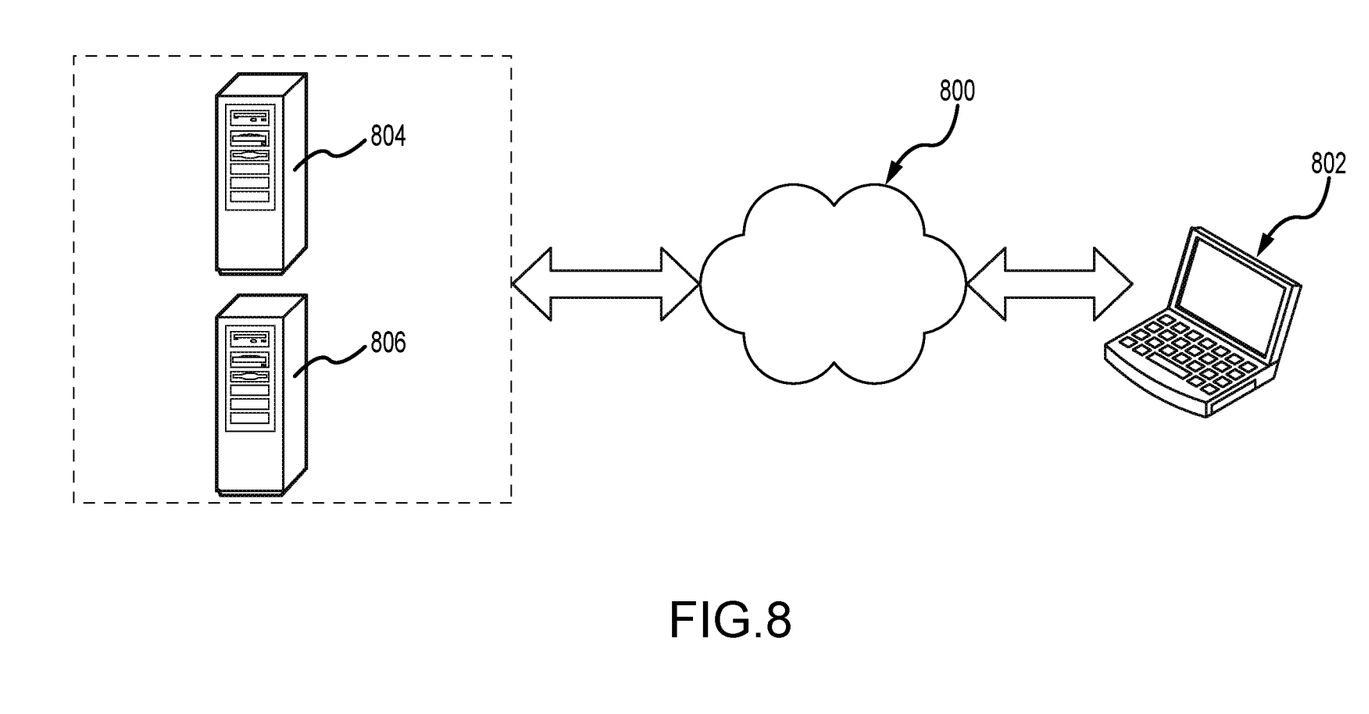
FIG. 8 depicts an example of a network in which the various systems and methods disclosed herein may operate.

FIG. 8 is an embodiment of a network 800 in which the various systems and methods disclosed herein may operate. In embodiments, a client device, such as client device 802, may communicate with one or more servers, such as servers 804 and 806, via a network 800. In embodiments, a client device may be a standalone imaging system (e.g., imaging system 100 depicted in FIG. 1A) that includes all the functionality described herein. The client device may also include or incorporate a laptop, a personal computer, a smart phone, a PDA, a netbook, or any other type of computing device, such as the computing device in FIG. 7. In examples, such a client device may be connected to an imaging system. In embodiments, servers 804 and 806 may also be any type of computing device, such as the computing device illustrated in FIG. 7. Network 800 may be any type of network capable of facilitating communications between the client device and one or more servers 804 and 806. For example, the surface image data and the internal image data may be acquired locally via the imaging systems and communicated to another computing device(s) for further processing, such as an image acquisition workstation or a cloud-based service. Examples of such networks include, but are not limited to, LANs, WANs, cellular networks, and/or the Internet.

In embodiments, the various systems and methods disclosed herein may be performed by one or more server devices. For example, in one embodiment, a single server, such as server 804 may be employed to perform the systems and methods disclosed herein, such as the methods for imaging discussed herein. Client device 802 may interact with server 804 via network 800. In further embodiments, the client device 802 may also perform functionality disclosed herein, such as scanning and image processing, which can then be provided to servers 804 and/or 806.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of determining performance characteristics of a breast compression paddle utilized in a breast imaging system, the method comprising:
   receiving a force application signal, wherein the force application signal is associated with an application of a compressive force by the breast imaging system with the breast compression paddle to a breast of a patient;
   applying the force application signal to an algorithm to obtain a reduction value; and
   subtracting the reduction value from a known paddle performance value for the breast compression paddle to obtain an updated paddle performance value for the breast compression paddle.

2. The method of claim 1, further comprising sending a result signal corresponding to the updated paddle performance value.

3. The method of claim 2, wherein the result signal is sent to a storage device disposed on the paddle.

4. The method of claim 2, wherein the result signal is sent to a storage device remote from both the breast imaging system and the breast compression paddle.

5. The method of claim 1, wherein the algorithm comprises a datum performance value corresponding to a known force.

6. The method of claim 5, wherein the algorithm further comprises dividing the datum performance value by an applied performance value associated with the force application signal to obtain the reduction value.

7. The method of claim 6, wherein subsequent to a first application of the force application signal to the algorithm, and a first subtraction of the reduction value from the known paddle performance value, the updated paddle performance value comprises a known paddle performance value for a second application of the force application signal to the algorithm.

8. A system for determining performance characteristics of a breast compression paddle utilized in a breast imaging system, the system comprising:
   a breast support platform for supporting a breast;
   a tube head rotatable relative to the breast support platform;
   an x-ray source disposed in the tube head;
   an x-ray detector disposed in the breast support platform;
   a compression paddle disposed between the x-ray source and the x-ray detector and configured to compress the breast against the breast support platform;
   a controller for controlling the x-ray source;
   at least one processor communicatively coupled to the controller; and
   memory communicatively coupled to the at least one processor, the memory comprising computer executable instructions that, when executed by the at least one processor, performs a method comprising:
      receiving a force application signal, wherein the force application signal is associated with an application of a compressive force to the breast between the breast support platform and the compression paddle; and
      calculating a performance effect on the compression paddle based at least in part on the force application signal.

9. The system of claim 8, wherein the compression paddle comprises a data storage device.

10. The system of claim 9, wherein the data storage device comprises an RFID chip.

11. The system of claim 9, wherein the data storage device is communicatively coupled to the at least one processor.

12. The system of claim 9, wherein the method further comprises sending a performance effect signal to the data storage device of the compression paddle, wherein the performance effect signal comprises a calculation of a number of paddle compressions remaining for the compression paddle.

13. The system of claim 12, wherein the method further comprises sending a service recommendation signal.

14. The system of claim 8, wherein the at least one processor and the memory are disposed remote from the controller.

15. The system of claim 8, wherein the at least one processor and the memory are integral with the controller.

16. A method of determining performance characteristics of a breast compression paddle utilized in a breast imaging system, the method comprising:
   reading a known paddle performance value from a data storage unit disposed on the breast compression paddle;
   applying a force to the breast, while supported on a breast support platform, with the breast compression paddle;
   recording the force applied to the breast with the breast compression paddle;
   applying the applied force to an algorithm to obtain a reduction value;
   calculating an updated paddle performance value for the breast compression paddle, wherein the updated paddle performance value is based at least in part on the known paddle performance value and the reduction value; and
   writing the updated paddle performance value to the data storage unit disposed on the breast compression paddle.

17. The method of claim 16, wherein the known paddle performance value is based at least in part on a compression paddle material.

18. The method of claim 16, wherein applying the applied force to an algorithm comprises dividing a datum performance value at a known force by an applied performance value associated with the applied force.

19. The method of claim 16, wherein calculating the updated paddle performance value comprises subtracting the reduction value from the known paddle performance value.

20. The method of claim 16, wherein writing the updated paddle performance value to the data storage unit comprises sending a signal to the data storage unit.

* * * * *